United States Patent
Lim et al.

(10) Patent No.: US 10,887,651 B2
(45) Date of Patent: Jan. 5, 2021

(54) SIGNALING AND OPERATION OF AN MMTP DE-CAPSULATION BUFFER

(71) Applicant: Samsung Electronics Co., Ltd., Suwon-si (KR)

(72) Inventors: Youngkwon Lim, Allen, TX (US); Imed Bouazizi, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1305 days.

(21) Appl. No.: 14/596,796

(22) Filed: Jan. 14, 2015

(65) Prior Publication Data

US 2015/0281770 A1  Oct. 1, 2015

Related U.S. Application Data

(60) Provisional application No. 61/973,092, filed on Mar. 31, 2014.

(51) Int. Cl.
*H04N 21/44* (2011.01)
*H04N 21/434* (2011.01)
(Continued)

(52) U.S. Cl.
CPC ..... *H04N 21/44004* (2013.01); *H04N 21/435* (2013.01); *H04N 21/4343* (2013.01);
(Continued)

(58) Field of Classification Search
CPC ......... H04N 21/44004; H04N 21/4343; H04N 21/64322; H04N 21/435; H04N 21/4381;
(Continued)

(56) References Cited

U.S. PATENT DOCUMENTS

2003/0223466 A1* 12/2003 Noronha, Jr. ........ H04N 21/226
370/537
2010/0332591 A1    12/2010 Yoshida
(Continued)

FOREIGN PATENT DOCUMENTS

| JP | 2011-15020 A | 1/2011 |
|---|---|---|
| KR | 10-2013-0057937 A | 6/2013 |
| KR | 10-2013-0058648 A | 6/2013 |

OTHER PUBLICATIONS

Park et al. "Study of ISO/IEC CD 23008-1 MPEG Media Transport", Oct. 2012.*
(Continued)

*Primary Examiner* — Ario Etienne
*Assistant Examiner* — Kidest Mendaye

(57) ABSTRACT

Methods and apparatuses for managing received data by a client device and indicating data removal management by a server. A method for managing received data by a client device includes receiving a message including information about a number of modes for removal of the data from a buffer at the client. The method also includes selecting a mode for removal of the data from the buffer with a maximum required buffer size among the modes indicated by the information about the modes in the received message and removing the data from the buffer based on the identified mode. A method for indicating data removal management by a server includes generating and sending a message including information about a number of modes for removal of received data from a buffer at a client device. The information indicates, for each of the modes, a type of mode for removal of the data.

16 Claims, 4 Drawing Sheets

(51) Int. Cl.
*H04N 21/435* (2011.01)
*H04N 21/438* (2011.01)
*H04N 21/643* (2011.01)
*H04L 12/835* (2013.01)

(52) U.S. Cl.
CPC ..... *H04N 21/4348* (2013.01); *H04N 21/4381* (2013.01); *H04N 21/64322* (2013.01); *H04L 47/30* (2013.01)

(58) Field of Classification Search
CPC ........... H04N 21/4348; H04N 21/6112; H04N 21/643; H04N 21/61; H04N 21/488; H04H 20/423; H04L 47/30
See application file for complete search history.

(56) References Cited

U.S. PATENT DOCUMENTS

| | | | | |
|---|---|---|---|---|
| 2013/0094563 | A1* | 4/2013 | Bae | H04N 21/236 375/240.01 |
| 2013/0117791 | A1* | 5/2013 | Chennupati | H04L 47/32 725/81 |
| 2013/0173826 | A1* | 7/2013 | Kim | H04N 21/4307 709/248 |
| 2014/0020111 | A1 | 1/2014 | Wang et al. | |
| 2014/0036999 | A1* | 2/2014 | Ryu | H04N 19/70 375/240.12 |
| 2014/0082146 | A1* | 3/2014 | Bao | H04L 65/605 709/219 |
| 2014/0314158 | A1 | 10/2014 | Hwang et al. | |
| 2014/0325572 | A1 | 10/2014 | Yie et al. | |
| 2015/0201207 | A1* | 7/2015 | Yie | H04N 19/463 375/240.26 |
| 2016/0295257 | A1* | 10/2016 | Iguchi | H04N 21/23614 |

OTHER PUBLICATIONS

ISO/IEC JTC 1/SC 29 N14364; ISO/IEC PDTR 23009-3; ISO/IEC JTC 1/SC 29/WG 11; "Information technology—Dynamic adaptive streaming over HTTP (DASH)—Part 3: Implementation Guidelines"; STD Version 2.1c2; 2013; 21 pages.

International Search Report dated Jun. 22, 2015, in connection with Application No. PCT/KR2015/003151; 3 pages.

Written Opinion of the International Searching Authority dated Jun. 22, 2015, in connection with Application No. PCT/KR2015/003151; 7 pages.

Extended European Search Report regarding Application No. 15772592.0, dated Jan. 31, 2018, 9 pages.

"Information technology—High efficiency coding and media delivery in heterogeneous environments—Part 1: MPEG media transport (MMT)", ISO/IEC JTC1/SC29/WG11, ISO/IEC DIS 23008-1, Apr. 2013, 92 pages.

Notification of Reason for Rejection regarding Japanese Patent Application No. 2016-559580, dated Aug. 28, 2018, 7 pages.

"Information technology—High efficiency coding and media delivery in heterogeneous environments—Part 1: MPEG media transport (MMT)", Final Draft, International Standard, ISO/IEC FDIS 23008-1, Jan. 2013, pp. 52-53.

* cited by examiner

SIGNALING AND OPERATION OF AN MMTP DE-CAPSULATION BUFFER

CROSS-REFERENCE TO RELATED APPLICATION AND CLAIM OF PRIORITY

The present application claims priority under 35 U.S.C. § 119(e) to U.S. Provisional Patent Application Ser. No. 61/973,092, filed Mar. 31, 2014, entitled "METHODS AND APPARATUS FOR SIGNALING AND OPERATION OF MMT PROTOCOL DE-CAPSULATION BUFFER". The above-identified provisional patent application is hereby incorporated by reference in its entirety.

TECHNICAL FIELD

The present application relates generally to media data delivery in a transmission system and, more specifically, to signaling and operation of a Moving Picture Experts Group (MPEG) media transport (MMT) protocol (MMTP) de-capsulation buffer.

BACKGROUND

MMT is a digital container standard or format that specifies technologies for the delivery of coded media data for multimedia service over heterogeneous IP network environments. The delivered coded media data includes both audio-visual media data requiring synchronized decoding and presentation of a specific unit of data in a designated time, namely timed data, and other types of data that are decoded and presented in an arbitrary time based on the context of service or interaction by the user, namely non-timed data.

MMT is designed under the assumption that the coded media data will be delivered through a packet-based delivery network using Internet Protocols (IPs), such as real-time transport protocol (RTP), transmission control protocol (TCP), user datagram protocol (UDP), etc. MMT is also designed with consideration for characteristics of different delivery environments.

SUMMARY

This disclosure provides signaling and operation of an MMTP de-capsulation buffer.

In one exemplary embodiment, a method for managing received data by a client device is provided. The method includes receiving a message including information about a number of modes for removal of the data from a buffer at the client device. The method also includes selecting a mode for removal of the data from the buffer with a maximum required buffer size among the modes indicated by the information about the modes in the received message. Additionally, the method includes removing the data from the buffer based on the identified mode.

In another exemplary embodiment, a method for indicating data removal management by a server is provided. The method includes generating a message including information about a number of modes for removal of received data from a buffer at a client device. The information indicates, for each of the modes, a type of mode for removal of the data. Additionally, the method includes sending the message to the client device.

In yet another exemplary embodiment, an apparatus in a client device for managing received data is provided. The apparatus includes a memory comprising a buffer configured to at least temporarily store the data, a receiver, and a controller. The receiver is configured to receive a message including information about a number of modes for removal of the data from a buffer at the client device. The controller is configured to select a type of mode for removal of the data from the buffer with a maximum required buffer size among the modes indicated by the information about the modes in the received message, and remove the data from the buffer based on the identified type of mode.

In still yet another exemplary embodiment, an apparatus for indicating data removal management is provided. The apparatus includes a controller and a transmitter. The controller is configured to generate a message including information about a number of modes for removal of received data from a buffer at a client device, the information indicating, for each of the modes, a type of mode for removal of the data. The transmitter is configured to send the message to the client device.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
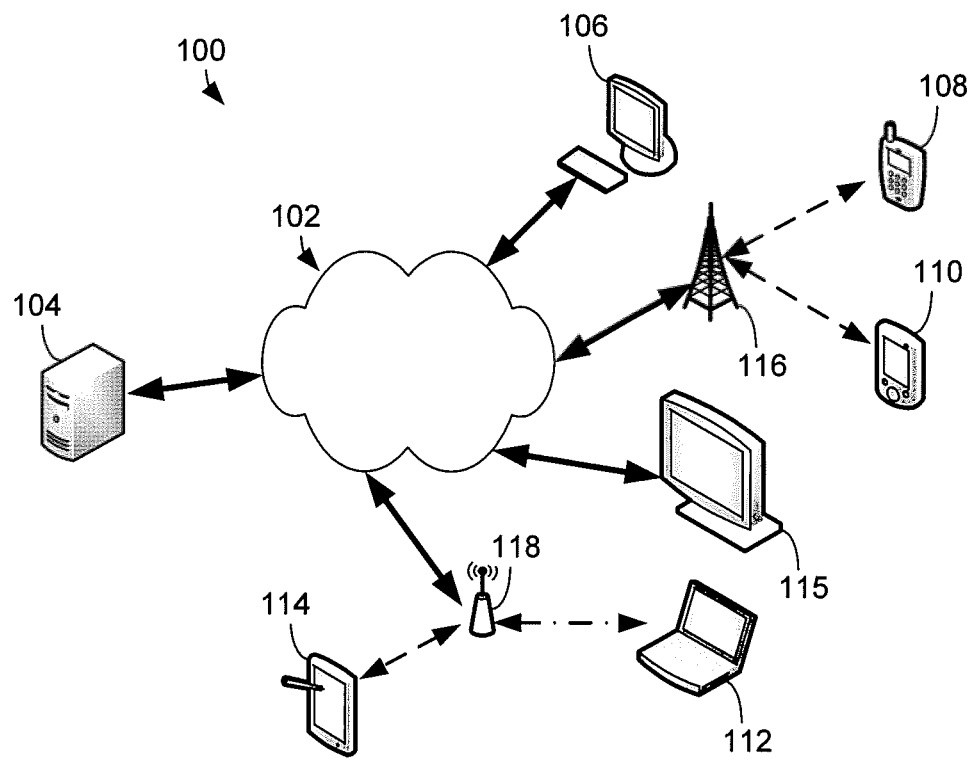
FIG. 1 illustrates an example communication system in which various embodiments of the present disclosure may be implemented.

FIGS. 1 through 8, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

MMT coding and media delivery is discussed in the following document and standards description: ISO/IEC JTC 1/SC29/WG11, High efficiency coding and media delivery in heterogeneous environments—Part 1: MPEG Media Transport (MMT), July 2012, which is hereby incorporated into the present disclosure as if fully set forth herein. For efficient and effective delivery of coded media data over heterogeneous IP network environments, MMT provides: a logical model to construct a content composed of various components for mash-up applications; the structure of data conveying information about the coded media data for the delivery layer processing, such as packetization and adaptation; a packetization method and packet structure to deliver media content agnostic to a specific type of media or coding method used over TCP or UDP, including hybrid delivery; a format of signaling messages to manage presentation and delivery of media content; a format of signaling messages to manage presentation and delivery of media content; and a format of information to be exchanged across the layers to facilitate cross-layer communication.

MMT defines three functional areas including encapsulation, delivery, and signaling. The encapsulation functional area defines the logical structure of media content, the MMT package, and the format data units to be processed by an MMT compliant entity. An MMT package specifies components including media content and the relationship among the media content to provide information needed for adaptive delivery. The format of the data units is defined to encapsulate the coded media to either be stored or carried as a payload of a delivery protocol and to be easily converted between storage and carrying. The delivery functional area defines the application layer protocol and format of the payload. The application layer protocol provides enhanced features, including multiplexing, for delivery of the MMT package compared to conventional application layer protocols for the delivery of multimedia. The payload format is defined to carry coded media data that is agnostic to the specific media type or encoding method. The signaling functional area defines the format of messages to manage delivery and consumption of MMT packages. Messages for consumption management are used to signal the structure of the MMT package, and messages for delivery management are used to signal the structure of payload format and configuration of the protocol.

MMT defines a new framework for delivery of time continuous multimedia, such as audio, video, and other static content, such as widgets, files, etc. MMT specifies a protocol (i.e., MMTP) for the delivery of an MMT package to a receiving entity. The MMTP signals transmission time of the MMTP package as part of the protocol header. This time enables the receiving entity to perform de-jittering by examining the transmission time and reception time of each incoming MMT packet.

Embodiments of the present disclosure recognize and take into consideration that the MMT specification may define a hypothetical receiver buffer model (HRBM) but does not define a method to remove data from an MMTP de-capsulation buffer.

Accordingly, one or more embodiments of the present disclosure provide for operation of an MMTP de-capsulation buffer and a message to signal information used or required to operate the MMTP de-capsulation buffer. Embodiments of the present disclosure also provide for calculation of the initial delay before starting removal of data from the MMTP de-capsulation buffer and the rate of removing data from MMTP de-capsulation buffer. Embodiments of the present disclosure further provide for operation of the MMTP de-capsulation buffer without overflow or underflow.

FIG. 1 illustrates an example communication system 100 in which various embodiments of the present disclosure may be implemented. The embodiment of the communication system 100 shown in FIG. 1 is for illustration only. Other embodiments of the communication system 100 could be used without departing from the scope of this disclosure.

As shown in FIG. 1, the system 100 includes a network 102, which facilitates communication between various components in the system 100. For example, the network 102 may communicate Internet Protocol (IP) packets, frame relay frames, Asynchronous Transfer Mode (ATM) cells, or other information between network addresses. The network 102 may also be a heterogeneous network including broadcasting networks, such as cable and satellite communication links. The network 102 may include one or more local area networks (LANs): metropolitan area networks (MANs); wide area networks (WANs); all or a portion of a global network, such as the Internet; or any other communication system or systems at one or more locations.

The network 102 facilitates communications between at least one server 104 and various client devices 106-115. Each server 104 includes any suitable computing or processing device that can provide computing services for one or more client devices. Each server 104 could, for example, include one or more processing devices, one or more memories storing instructions and data, and one or more network interfaces facilitating communication over the network 102.

Each client device 106-115 represents any suitable computing or processing device that interacts with at least one server or other computing device(s) over the network 102. In this example, the client devices 106-115 include a desktop computer 106, a mobile telephone or smartphone 108, a personal digital assistant (PDA) 110, a laptop computer 112, tablet computer 114; and a set-top box and/or television 115. However, any other or additional client devices could be used in the communication system 100.

In this example, some client devices 108-114 communicate indirectly with the network 102. For example, the client devices 108-110 communicate via one or more base stations 116, such as cellular base stations or eNodeBs. Also, the client devices 112-115 communicate via one or more wireless access points 118, such as IEEE 802.11 wireless access points. Note that these are for illustration only and that each client device could communicate directly with the network 102 or indirectly with the network 102 via any suitable intermediate device(s) or network(s).

As described in more detail below, network 102 facilitates communication of media data, for example, such as images, video, and/or audio, from server 104 to client devices 106-115 using MMTP. Given that MMT is also designed with consideration for characteristics of different delivery environments, the server 104 may broadcast or stream the media data over the network to client devices 106-115 using MMTP. Additionally, the server 104 may provide buffer removal mode signaling via a message to indicate MMTP de-capsulation buffer operation and management MMTP de-capsulation buffer together with or separately from the media data.

Although FIG. 1 illustrates one example of a communication system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
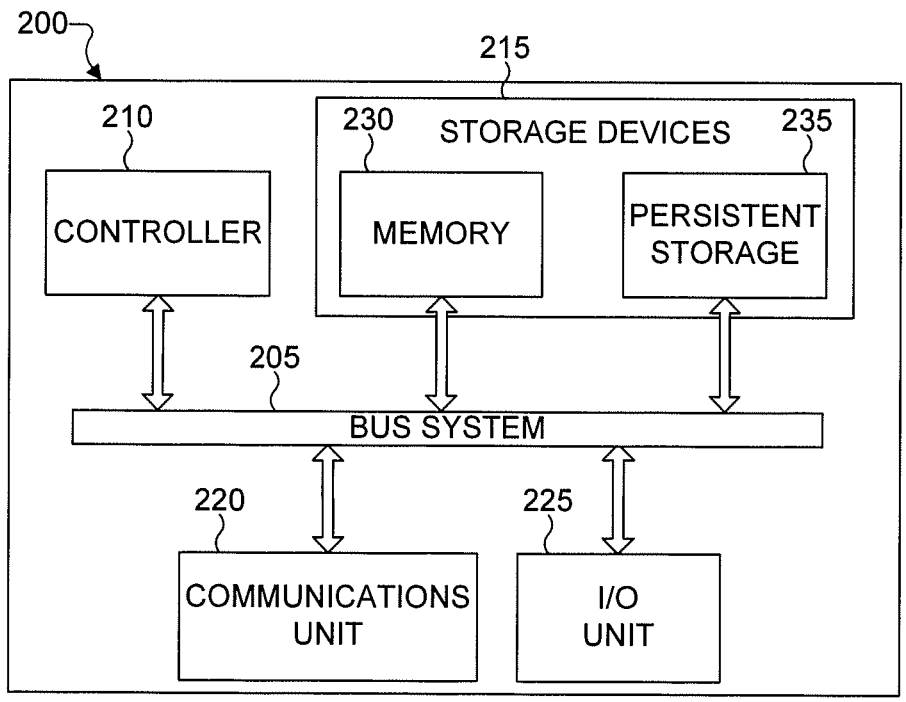
FIGS. 2 and 3 illustrate example devices in a communication system according to this disclosure.
Figure 3:
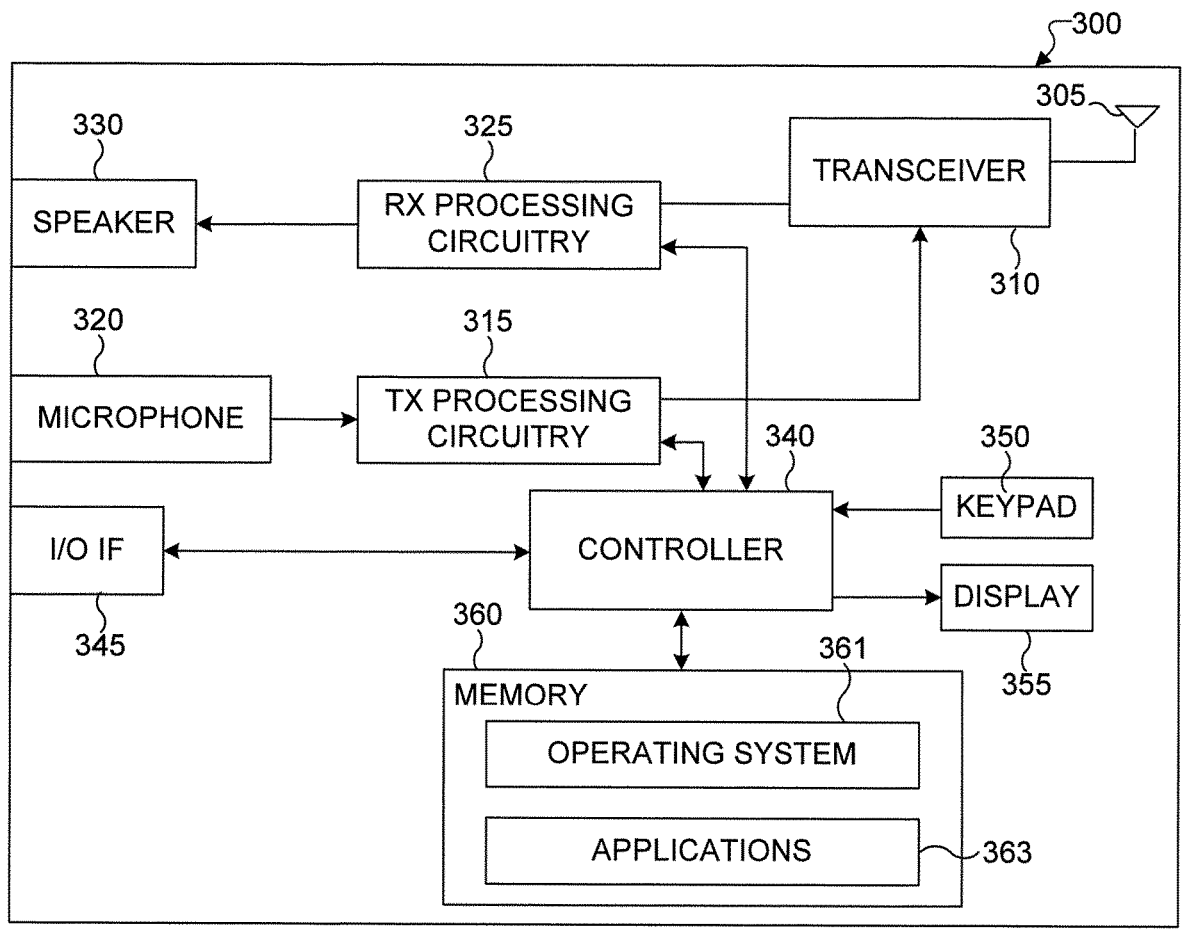

FIGS. 2 and 3 illustrate example devices in a computing system according to this disclosure. In particular, FIG. 2 illustrates an example server 200, and FIG. 3 illustrates an example client device 300. The server 200 could represent the server 104 in FIG. 1, and the client device 300 could represent one or more of the client devices 106-115 in FIG. 1.

As shown in FIG. 2, the server 200 includes a bus system 205, which supports communication between at least one controller 210, at least one storage device 215, at least one communications unit 220, and at least one input/output (I/O) unit 225.

The controller 210 executes instructions that may be loaded into a memory 230. The controller 210 may include any suitable number(s) and type(s) of processors or other devices in any suitable arrangement. Example types of controllers 210 include microprocessors, microcontrollers, digital signal processors, field programmable gate arrays, application specific integrated circuits, and discreet circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a read-only memory, hard drive, Flash memory, or optical disc.

The communications unit 220 supports communications with other systems or devices. For example, the communications unit 220 could include a network interface card or a wireless transceiver facilitating communications over the network 102. The communications unit 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

Note that while FIG. 2 is described as representing the server 104 of FIG. 1, the same or similar structure could be used in one or more of the client devices 106-115. For example, a laptop or desktop computer could have the same or similar structure as that shown in FIG. 2.

As described in more detail below, the server 200 sends media data and/or buffer removal mode signaling via a message to indicate MMTP de-capsulation buffer operation and management MMTP de-capsulation buffer together with or separately from the media data. In one example, the server 200 may be a broadcast entity for broadcasting media data over an IP network.

As shown in FIG. 3, the client device 300 includes an antenna 305, a transceiver 310, transmit (TX) processing circuitry 315, a microphone 320, and receive (RX) processing circuitry 325. The client device 300 also includes a speaker 330, a controller 340, an input/output (I/O) interface (IF) 345, a keypad 350, a display 355, and a memory 360. The memory 360 includes an operating system (OS) 361 and one or more applications 363.

The transceiver 310 receives, from the antenna 305, an incoming RF signal transmitted by another component in a system. The transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the controller 340 for further processing (such as for web browsing data).

The TX processing circuitry 315 receives analog or digital voice data from the microphone 320 or other outgoing baseband data (such as web data, e-mail, or interactive video game data) from the controller 340. The TX processing circuitry 315 encodes, multiplexes, and/or digitizes the outgoing baseband data to generate a processed baseband or IF signal. The transceiver 310 receives the outgoing processed baseband or IF signal from the TX processing circuitry 315 and up-converts the baseband or IF signal to an RF signal that is transmitted via the antenna 305.

The controller 340 can include one or more processors or other processing devices and execute the basic operating system 361 stored in the memory 360 in order to control the overall operation of the client device 300. For example, the controller 340 could control the reception of forward channel signals and the transmission of reverse channel signals by the transceiver 310, the RX processing circuitry 325, and the TX processing circuitry 315 in accordance with well-known principles. In some embodiments, the controller 340 includes at least one microprocessor or microcontroller.

The controller 340 is also capable of executing other processes and programs resident in the memory 360. The controller 340 can move data into or out of the memory 360 as required by an executing process. In some embodiments, the controller 340 is configured to execute the applications 363 based on the operating system 361 or in response to signals received from external devices or an operator. The controller 340 is also coupled to the I/O interface 345, which provides the client device 300 with the ability to connect to other devices, such as laptop computers and handheld computers. The I/O interface 345 is the communication path between these accessories and the controller 340.

The controller 340 is also coupled to the keypad 350 and the display 355. The operator of the client device 300 can use the keypad 350 to enter data into the client device 300. The display 355 may be a liquid crystal display or other display capable of rendering text and/or at least limited graphics, such as from web sites.

The memory 360 is coupled to the controller 340. Part of the memory 360 could include a random access memory (RAM), and another part of the memory 360 could include a Flash memory or other read-only memory (ROM).

As described in more detail below, the client device 300 receives media data buffer removal mode signaling. For example, the client device 300 may receive and process media data according to an HRBM. The client device 300 may also identify MMTP de-capsulation buffer data removal operation and management from a message received from a server. In one example, the client device 300 may be a mobile device that receives broadcast media data over an IP network.

Although FIGS. 2 and 3 illustrate examples of devices in a computing system, various changes may be made to FIGS. 2 and 3. For example, various components in FIGS. 2 and 3 could be combined, further subdivided, or omitted, and additional components could be added according to particular needs. As a particular example, the controller 340 could be divided into multiple processors, such as one or more central processing units (CPUs) and one or more graphics processing units (GPUs). Also, while FIG. 3 illustrates the client device 300 configured as a mobile telephone or smartphone, client devices could be configured to operate as other types of mobile or stationary devices including, for example, without limitation, a set-top box, a television, and a media streaming device. In addition, as with computing and communication networks, client devices and servers can come in a wide variety of configurations, and FIGS. 2 and 3 do not limit this disclosure to any particular client device or server.

Figure 4:
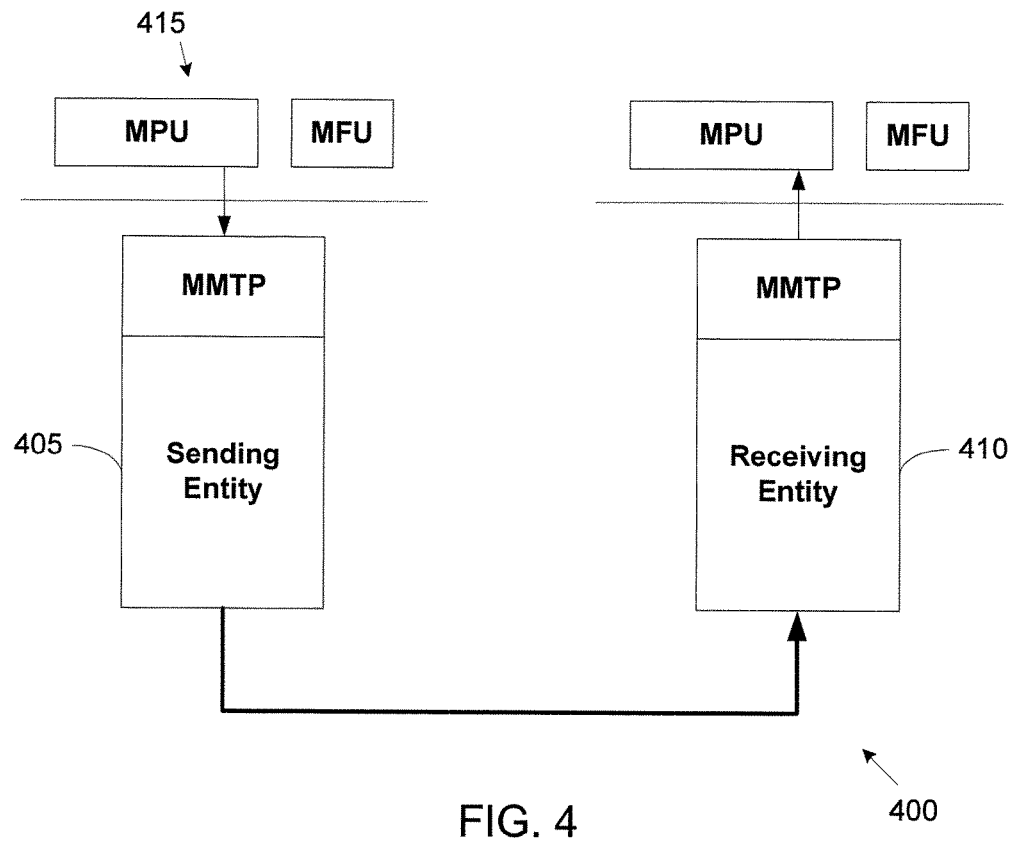
FIG. 4 illustrates an example block diagram of MMTP input/output in an MMTP data transmission environment according to this disclosure.

FIG. 4 illustrates an example block diagram of MMTP input/output in an MMTP data transmission environment 400 according to this disclosure. In this illustrative example, a sending entity 405, for example, a server, such as the server 200 in FIG. 2, sends media data over a transmission medium to a receiving entity 410, for example, a client device such as the client device 300 in FIG. 3, according to MMTP. The media data 415 is processed at the sending entity 405 according to MMTP. For example, the sending entity 405 may perform MMT package encapsulation, coding, delivery, and signaling for the media data as MMT processing units (MPUs) and MMT fragmentation units (MFUs) (e.g., fragments of an MPU). The processed media data is then sent (e.g., as packets) to the receiving entity 410 for processing (e.g., de-capsulation, decoding, etc.) according to MMTP. The media data processed at the receiving entity 410 is then passed up to an upper layer programming (e.g., an application layer program, such as a media player) as MPUs and/or MFUs for presentation to a user on a visual and/or audio display device completing delivery of the media data.

Figure 5:
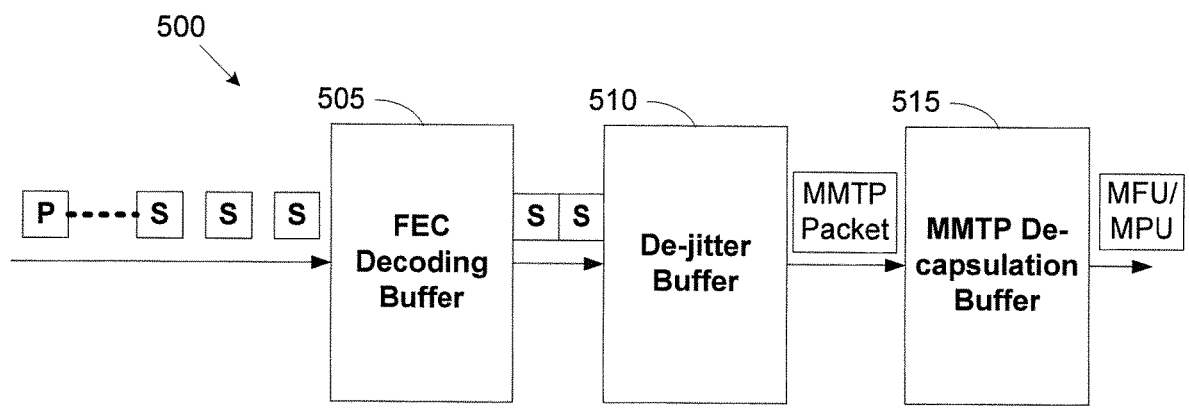
FIG. 5 illustrates a block diagram of an example receiver buffer model for simulating the receiver behavior at the receiver side and for estimating a buffer delay and size requirement according to this disclosure.

FIG. 5 illustrates a block diagram of an example receiver buffer model 500 for simulating the receiver behavior at the receiver side and for estimating a buffer delay and size requirement according to this disclosure. In various embodiments of the present disclosure, a sending entity 405, such as a media-delivery server (or other MMT aware node), calculates, determines, and/or identifies a fixed end-to-end delay for media data delivery in the point-to-multipoint transmission system. For example, the sending entity 405 may utilize model 500 to determine effects of media data processing performed on the packet stream on reception constraints in a receiver of a receiving entity 410. For example, the sending entity 405 may utilize the model to determine a required buffering delay and a required buffer size and communicate this information to entities receiving the media data.

In this illustrative example, the FEC decoding buffer 505 is a model for estimating a delay and/or buffer size requirement associated with FEC decoding. FEC decoding is typical for many applications, where lower layer transmission may not be sufficient to recover from channel errors or when network congestion may cause packet drops or excessive delays. To perform FEC decoding, the receiving entity 410 uses a buffer where incoming packets are stored until sufficient source ("S") and repair data ("P" parity data) is available to perform FEC decoding.

In this illustrative example, the sending entity 405 uses the model of the FEC decoding buffer 505 to determine actions that the receiving entity 410 would take regarding FEC decoding to estimate the delay associated with FEC decoding. In other words, the sending entity 405 uses the model of the FEC decoding buffer 505 to predict actions taken by the receiving entity 410 to estimate FEC decoding delay. This modeling of the FEC decoding buffer 505 by the sending entity 405 starts with the FEC decoding buffer 505 being assumed to be initially empty. Next, for each incoming packet i with transmission timestamp ts, the receiving entity 410 buffers the packet i using the FEC decoding buffer 505, if buffer_occupancy+packet_size<max_buffer_size. Otherwise, the receiving entity 410 discards packet i as being non-conformant with the buffer model. The receiving entity 410 then determines if FEC is applied to packet i. If FEC is applied to packet i, the receiving entity 410 determines source block j to which packet i belongs, determine the insertion time t of a first packet of source block j, at time t+FEC_buffer_time moves all packets (after FEC correction, if needed) of source block j to the de-jitter buffer, and discards the repair packets. The sending entity 405 utilizes the FEC_buffer_time as the required buffer time for FEC decoding from the reception of the first packet of a source block and until FEC decoding is attempted. This time is typically calculated based on the FEC block size.

The de-jitter buffer 510 is a model used by the sending entity to estimate a delay and/or buffer size requirement associated with de-jittering of packets, i.e. removal of the delay jitter of packets. The de-jitter buffer ultimately ensures that MMTP packets experience a fixed transmission delay from the source to the output of the MMTP protocol stack, assuming a maximum transmission delay. The receiving entity 410 may discard data units that experience a transmission delay larger than the maximum transmission delay as being very late.

This modeling of the de-jitter buffer 510 by the sending entity 405 starts with the de-jitter buffer being assumed to be initially empty. The receiving entity 410 then inserts an MMTP packet in the de-jitter buffer 510 as the packet arrives. The receiving entity 410 then removes the MMTP packet at time ts+Δ, where ts is the transmission timestamp of the MMTP packet and Δ is the fixed end-to-end delay that is signaled for the media data. After the de-jittering is applied, all MMTP packets that arrived correctly (or were recovered through FEC/retransmissions) will have experienced the same end-to-end delay.

The MMTP de-capsulation buffer 515 is a model used by the sending entity to estimate a delay and/or buffer size requirement associated with MMTP processing before passing the output to the upper layers. The output of the MMTP processor may either be the MFU payload (in low-delay operation), a complete movie fragment, or a complete MPU. MPUs may be fragmented into smaller packets or aggregated into larger packets, depending on their size. The de-capsulation (removal of the MMTP packet and payload headers) and any required de-fragmentation/de-aggregation of the packets is then performed as part of the MMTP processing. This procedure may require some buffering delay, called de-capsulation delay, to perform assembly when an MPU is fragmented into multiple MMTP packets. However, in this illustrative embodiment, de-capsulation delay may not be considered as part of the fixed end-to-end delay, and the availability of an MPU for consumption by the coded media layer can be guaranteed by the entity fragmenting the MPU into multiple MMTP packets, regardless of the de-capsulation delay. While used as a model by the sending entity 405, each of the buffers 505, 510, and 515 may be implemented in the memory of a receiving entity, such as, for example, memory 360 of client device 300.

In various embodiments of the present disclosure, the MMTP de-capsulation buffer 515 may operate as follows. The MMTP de-capsulation buffer 515, when initially empty, receives an MMTP packet after the de-jittering is performed by the de-jitter buffer 510. For MMTP packets carrying aggregated payload, the receiving entity 410 removes the packet and payload header and extracts each single data unit. For MMTP packets carrying fragmented payload, the packet is kept in the buffer until all corresponding fragments are received correctly or until a packet is received that does not belong to the same fragmented data unit. As discussed in greater detail below, depending on the operation mode of the client, if a complete MPU, a movie fragment, or a single MFU is recovered, the sending entity 405 forwards the reconstructed data to an upper layer, such as a presentation layer, for display to a user.

As discussed above, the receiver buffer model or HRBM of MMT defines a buffer model to preserve end-to-end delay of MMTP packet delivery. Embodiments of the present disclosure further provide a message to signal information used and/or required to calculate both the initial delay before starting removal of data from the MMTP de-capsulation buffer 515 and the rate of removing data from the MMTP de-capsulation buffer 515.

In various embodiments of the present disclosure, the server 200 provides a message to the client device 300 which includes information on the management of MMT de-capsulation buffer depending on the operation mode of the client device 300. In one embodiment, this message may be an HRBM removal message. In another embodiment, the information may be included with any other MMT signaling message used to signal information, such as, for example, a message used to signal the fixed, end-to-end delay. This message provides information that the client device 300 uses and/or requires to calculate both the initial delay before starting removal of data from the MMTP de-capsulation buffer 515 and the rate of removing data from the MMTP de-capsulation buffer 515. If this message is signaled, the client device 300 identifies, selects, and/or chooses one of possible, currently available and/or supported operation modes for the data transmission. The client device 300 may select the operation mode with the maximum required buffer size signaled by this message to avoid and/or prevent overflow and/or underflow of MMTP de-capsulation buffer 515. Depending on the mode chosen, the client device 300 recovers a complete MPU, a movie fragment, or a single MFU, and the reconstructed data is forwarded to the upper layer, such as the media engine.

Table 1 below provides example syntax for the HRBM removal message:

| Syntax | No. of Bits |
|---|---|
| HRBM_Data_Removal ( ){ | |
|     message_id | 16 |
|     Version | 8 |
|     Length | |
|     extension { | |
|         extension_fields_Byte | 16 |
|     } | |
|     message_payload{ | |
|     number_of_operation_modes | 8 |
|     for(i=0; i<number_of_operation_mode; i++){ | |
|         data_removal_type | 8 |
|         max_decapsulation_buffer_size | 32 |
|     } | |
|     buffer_management_valid | 1 |
|     reserved | 7 |
|     } | |
| } | |

In this illustrative example, "message_id" indicates the identifier of the HRBM_Data_Removal message and "version" indicates the version of the HRBM_Data_Removal messages. For example, an MMT receiving entity (e.g., the client device 300) may use this field to check the version of the received HRBM_Data_Removal message. Further, "length" indicates the length of the HRBM_Data_Removal messages in bytes, counting from the first byte of the next field to the last byte of the HRBM_Data_Removal message. The value '0' may not be valid for this field. Continuing, "number_of_operation_modes" provides the number of operation modes that are currently available and/or supported for the data transmission for the client device 300 to choose to operate (e.g., as illustrated in Table 2 below) and "data_removal_type" provides information for the type of operation mode of client removing data reconstructed at the MMTP de-capsulation buffer 515. For each mode, the required buffer size is provided.

Additionally, "max_decapsulation_buffer_size" provides information for the required maximum size of MMTP de-capsulation buffer in bytes of MMT assets, and "buffer_management_valid" provides information about whether buffer management mechanism defined for an asset is applied. For example, if this flag is set to '0', no restriction to both the initial delay before starting removal of data from MMTP de-capsulation buffer 515 and the rate of removing data from MMTP de-capsulation buffer 515 is applied. Reconstructed data is available at the MMTP de-capsulation buffer 515 until the buffer 515 becomes full. Reconstructed data is removed from the oldest one (e.g., oldest complete MPU, movie fragment, or MFU) according to the operation mode chosen by the client when the buffer is full to add newly received and recovered data. If this flag is set to '1', appropriate information to calculate both the initial delay before starting removal of data from MMTP de-capsulation buffer 515 and the rate of removing data from MMTP de-capsulation buffer 515 is carried in the media data based on external specification.

Table 2 below provides example coding for "data_removal_type" values and different types of modes that the client device 300 can choose to operate.

| Value | Description |
| --- | --- |
| 0x00 | Reserved |
| 0x01 | Client can remove complete MPUs (MPU mode) |
| 0x02 | Client can remove complete movie fragments (movie fragment mode) |
| 0x03 | Client can remove complete MFUs (MFU mode) |
| 0x04~0x9F | reserved for ISO use |
| 0xA0~0xFF | reserved for private use |

In these illustrative embodiments, the types of modes selectable by the client device 300 include MPU mode, movie fragment mode, and MFU mode. The client device 300 may select which mode to operate in based on the available buffer size of the client device 300, buffer size requirements for the media data, and/or presentation requirements associated with the type of media consumption with which the user of the client device 300 is engaged. For example, in non-real-time scenarios where buffer availability is not a serious constraint, such as recording media content for later viewing, the client device 300 may choose to wait for full MPUs and operate in the MPU mode. In more real-time media consumption applications, the client device 300 may use the MFU mode or the movie fragment modes to pass the media data to the presentation layer more quickly. In the movie fragment mode, multiple related MFUs and associated metadata are processed together for sending the related MFUs to the presentation layer.

Figure 6:
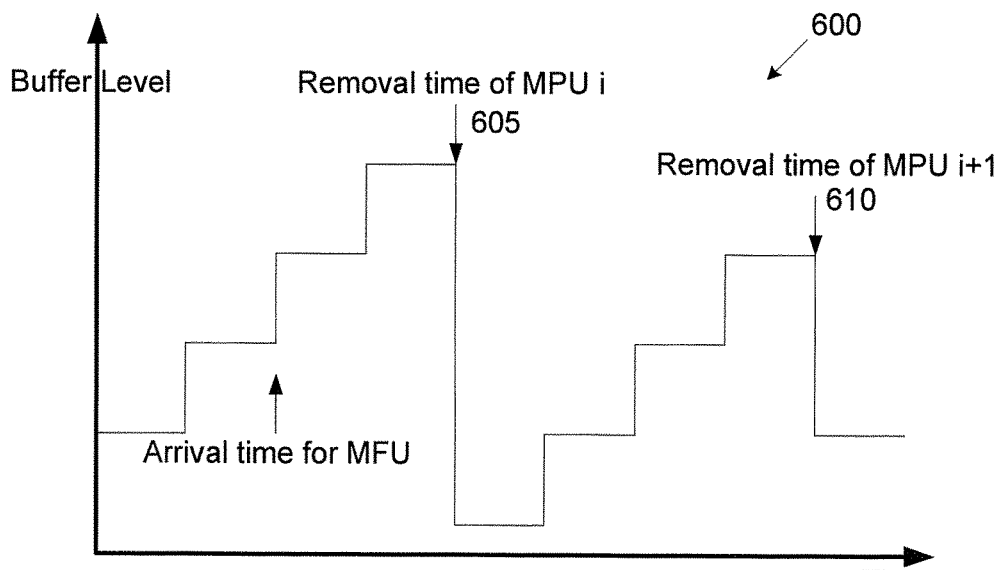
FIG. 6 illustrates an example timing diagram for MMTP packet processing in the MMTP de-capsulation buffer illustrated in FIG. 5 according to this disclosure.

FIG. 6 illustrates a timing diagram 600 for MMTP packet processing in the MMTP de-capsulation buffer 515 in accordance with various embodiments of the present disclosure. The timing diagram 600 is an example of a buffer level in the MMTP de-capsulation buffer 515 over time as MMTP packets are processed and output to upper layers. For example, the timing diagram 600 is an illustration of estimating the buffer requirement associated with MMTP packet processing.

The modeling of the MMTP de-capsulation buffer 515 by the sending entity 405 starts with the MMTP de-capsulation buffer 515 assumed as initially empty. The receiving entity 410 inserts an MMTP packet into the MMTP de-capsulation buffer 515 after the de-jittering is performed. For MMTP packets carrying aggregated payload, the receiving entity 410 removes the packet and payload header and splits the aggregate into separate MPUs. For MMTP packets carrying fragmented payload, the receiving entity 410 keeps the packet in the MMTP de-capsulation buffer 515 until all corresponding fragments are received correctly or until a packet is received that does not belong to the same fragmented MPU. If all fragments of an MPU are received (e.g., at time 605 or time 610), the receiving entity 410 removes the MMTP packet and payload header, reassembles, and forwards the reconstructed MPU to the upper layer. Otherwise, if some fragments of the MPU are not received, the receiving entity 410 may discard fragments of the non-complete MPU.

Based on this receiver buffer model 500, the sending entity 405 is able to determine the transmission schedule, the buffer size, and the buffering delay Δ, and reduce and/or ensure that no packets are dropped, assuming a maximum delivery delay in the target path. The sending entity 405 provides and/or guarantees packets that experience a transmission delay below a set threshold will be output to the upper layer after a constant delay across the point-to-multipoint transmission system and without causing the client buffer to underflow or overflow.

After determining the required buffer size and the fixed end-to-end delay for the media data, the sending entity 405 communicates this information to the receiving entity 410. For example, the sending entity 405 may communicate this information to the receiving entity 410 using a signaling protocol between the sending and receiving entities. In various embodiments, the sending entity 405 may continuously run the receiver buffer model 500 to verify that the selected end-to-end delay and buffer size are aligned and do not cause buffer under-runs or overruns. At the receiver side, the signaling of the fixed delay instructs the receiving entity 410 to perform buffering so that each data unit experiences the signaled fixed end-to-end delay Δ before the data unit is forwarded to upper layers. Under the assumption that clocks between the sending and receiving entities are synchronized, the receiving entity 410 can calculate the output time of the data based on the transmission timestamp and the signaled fixed end-to-end delay.

In some embodiments, sending entity 405 performs the signaling using a session description file, such as a session description protocol (SDP) file. In an SDP, a media session is described that is delivered using the MMTP protocol. The media session includes the fixed end-to-end delay and/or the required buffer size. Table 3 below illustrates one example of a media session description of an SDP file that signals the fixed end-to-end delay and the buffer size requirement.

TABLE 3 m=asset 43442 UDP/MMTP 1
a=assetid:1 MP4
a=min-buffer-size: 1000000
a=end-to-end-delay: 4500

In another embodiment, the signaling of the fixed end-to-end delay and the buffer size requirement is performed using the MMTP Signaling Function. In such embodiment, a new signaling message is devised to carry the above information.

In this example, the buffer size is given in bytes, and the fixed end-to-end delay is given in milliseconds. In other embodiments, sending entity 405 may perform the signaling using MMTP signaling messages, where either a special signaling message type is defined or the information is included in an existing signaling message.

In determining the fixed delay, the sending entity 405 estimates the maximum expected and tolerable transmission delay in the transmission path down to the receivers. If FEC is in use, the sending entity 405 adds an FEC buffering delay that covers for the time needed to assemble a source block (e.g., FEC_buffer_time discussed above), in the situation that FEC decoding is required to recover lost MMTP packets. Additionally, the sending entity 405 adds any delays that might be incurred by fragmentation of packets. The sending entity 405 signals the resulting estimation of the MMTP delivery delay as the fixed end-to-end delay. One example of estimating the fixed end-to-end delay is provided by Equation 1 below:

$$\text{fixed end-to-end delay} = \text{maximum transmission delay} + \text{FEC\_buffer\_time} \quad \text{[Equation 1]}$$

In various embodiments, to estimate the resulting buffer requirement, the sending entity 405 may use the fixed end-to-end delay and subtract the minimum transmission delay for the transmission path down to the receiver as an estimated maximum amount of time that the data would need to be buffered by the sending entity 405. The sending entity 405 may then estimate the buffer size requirement as the maximum bitrate of the MMTP stream multiplied by the calculated buffered data duration. One example of estimating the fixed end-to-end delay is provided by Equation 2 below:

$$\text{buffer size} = (\text{maximum delay} - \text{minimum delay}) * \text{maximum bitrate} \quad \text{[Equation 2]}$$

While various embodiments described herein discuss MMTP data communication, it is noted that the various embodiments of the present disclosure are not limited to MMT communications. For example, any and all of the mode signaling and determination, the fixed delay, and the buffer size determinations may be applied to any suitable type of data or media content delivery and/or any suitable type of transmission system in accordance with the principals of the present disclosure.

Figure 7:
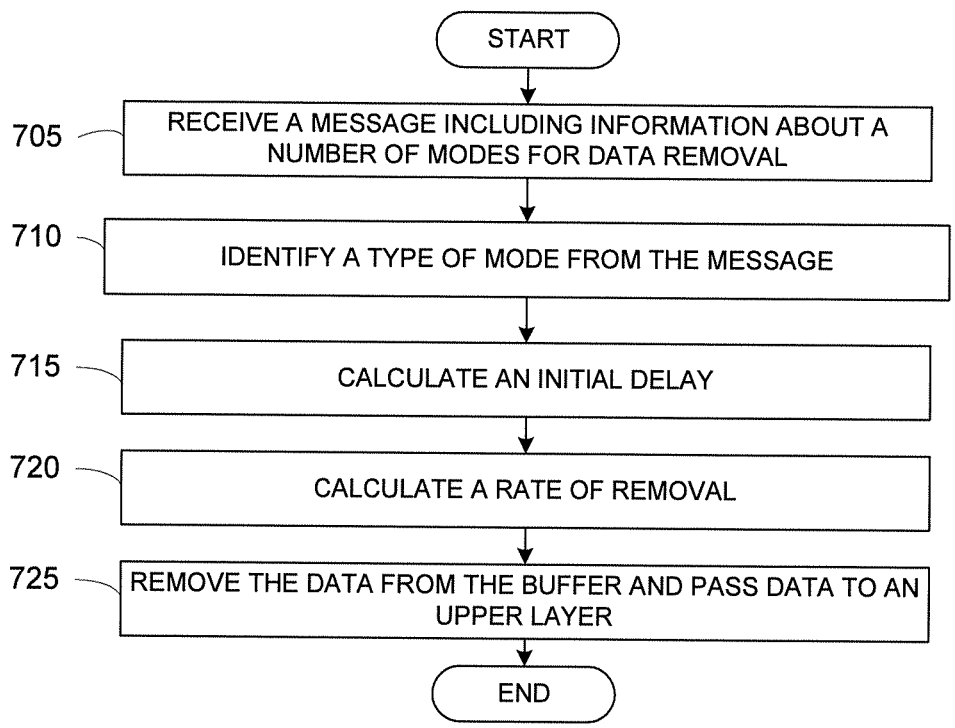
FIG. 7 illustrates a flowchart of an example process for managing received data by a client device according to this disclosure.

FIG. 7 illustrates a flowchart for an example process for managing received data by a client device according to this disclosure. For example, the process depicted in FIG. 7 may be performed by the receiving entity 410 in FIG. 4. The process may also be implemented by the client device 300 in FIG. 3.

The process begins with the client device receiving a message including information about a number of modes for data removal (step 705). For example, in step 705, the client device receives a message for managing removal of media data from a buffer at the client device. This message may be an HRBM removal message, may be included with other MMT signaling messages, and/or may be included at the beginning of streaming media content to the client device. In one example, this buffer is the MMTP de-capsulation buffer 515 in FIG. 5. Around the time of receiving the message, for example, after receiving the message, the client device may start to receive the media data transmission associated with the message and the modes of data removal. The message may also be received after the media data transmission has started to be received by the client device, for example, if supported and/or available removal modes for the media data have changed.

The client device then identifies a type of mode from the message (step 710). For example, in step 710, the client device identifies a mode to use for removal of the data from the buffer from the information about the modes indicated in the received message. The modes may include a mode where the client device can remove complete MPUs, a mode where the client device can remove complete movie fragments, and a mode where the client device can remove complete MFUs. The client device (e.g., the controller 340) may select the type of mode with a maximum required buffer size among the modes indicated in the message to prevent overflow or underflow of the buffer.

The client device calculates an initial delay (step 715). For example, in step 715, the client device may calculate the initial delay based on transmission parameters of the data and the mode chosen (e.g., time until enough either complete MPUs, MFUs, or movie fragments have been received to begin starting removal of the data from the buffer). The client device also calculates a rate of removal (step 720). For example, in step 720, the client device may calculate the rate of removal based on transmission parameters of the data and the mode chosen (e.g., the rate at which either complete MPUs, MFUs, or movie fragments are received and reconstructed and the requirements for presentation, e.g., real-time display, recording, etc.). The client device may calculate both the initial delay and the rate of removal before removing the data from the buffer.

Thereafter, the client device removes the data from the buffer and passes the reconstructed data to an upper layer (step 725). For example, in step 725, the client device may remove the data based on the identified type of mode (e.g., remove complete MPUs, MFUs, or movie fragments). The client device passes the reconstructed data to an upper layer, such as a presentation layer, for presentation to a user on a display.

Figure 8:
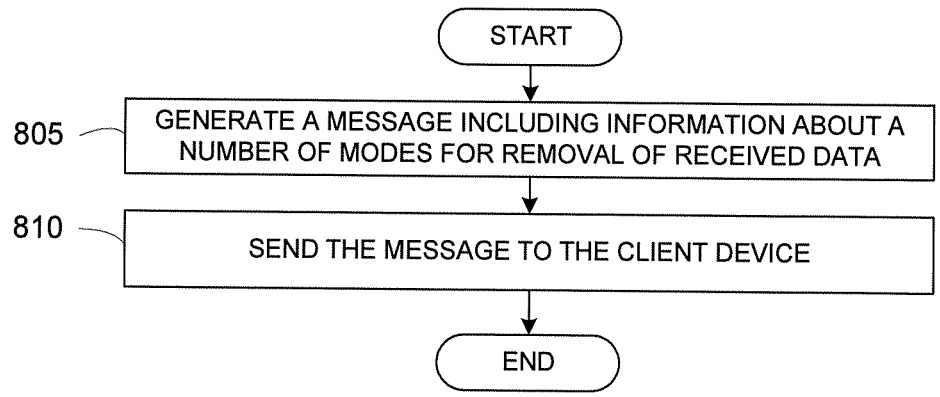
FIG. 8 illustrates a flowchart of an example process for indicating data removal management by a server according to this disclosure.

FIG. 8 illustrates a flowchart for an example process for indicating data removal management by a server according to this disclosure. For example, the process depicted in FIG. 8 may be performed by the sending entity 405 in FIG. 4. The process may also be implemented by the server 200 in FIG. 2.

The process begins with the server generating a message including information about a number of modes for removal of received data (step 805). For example, in step 805, the message may include management information about removal of media data from a buffer at a client device. The server may include, for example, information indicating, for each of the number of available and/or supported modes, a type of mode for removal of the data. The server may also include information in the message that indicates a required maximum size of the buffer.

Thereafter, the server sends the message to the client device (step 810). For example, in step 810, the server sends the message to the client device to signal operation and management of data removal from the client device's MMTP de-capsulation buffer. In these examples, the server may be the same server or a different server than the server that sends the media data to the client device.

Although FIGS. 7 and 8 illustrate examples of processes for managing received data by a client device and indicating data removal management by a server, respectively, various changes could be made to FIGS. 7 and 8. For example, while shown as a series of steps, various steps in each figure could overlap, occur in parallel, occur in a different order, or occur multiple times.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method for managing received data by a client device, the method comprising:
   receiving, by the client device, a message from a server, the message including information about a number of modes for removal of the data from a buffer at the client device;
   selecting, by the client device, a mode for removal of the data from the buffer with a maximum required buffer size among the modes indicated by the information about the modes in the received message; and
   removing, by the client device, the data from the buffer based on the selected mode,
   wherein the modes comprise a mode where the client device removes complete Moving Picture Experts Group (MPEG) media transport (MMT) processing units (MPUs), a mode where the client device removes complete movie fragments, and a mode where the client device removes complete MMT fragmentation units (MFUs).

2. The method of claim 1, wherein removing the data from the buffer based on the selected mode comprises:
   calculating an initial delay before starting removal of the data from the buffer; and
   calculating a rate of removing the data from the buffer.

3. The method of claim 1, wherein the message is a hypothetical receiver buffer model (HRBM) removal message.

4. The method of claim 1, wherein the buffer is a Moving Picture Experts Group (MPEG) media transport protocol (MMTP) de-capsulation buffer.

5. The method of claim 1, wherein removing the data from the buffer comprises forwarding the data for presentation to a user.

6. A method for indicating data removal management by a server, the method comprising:
   generating, by the server, a message including information about a number of modes for removal of received data from a buffer at a client device, the information indicating, for each of the modes, a type of mode for removal of the data, and
   sending, by the server, the message to the client device,
   wherein the modes comprise a mode where the client device removes complete Moving Picture Experts Group (MPEG) media transport (MMT) processing units (MPUs), a mode where the client device removes complete movie fragments, and a mode where the client device removes complete MMT fragmentation units (MFUs).

7. The method of claim 6, wherein the information in the message further indicates a required maximum size of the buffer.

8. The method of claim 6, wherein the message is a hypothetical receiver buffer model (HRBM) removal message.

9. An apparatus in a client device for managing received data, the apparatus comprising:
   a memory comprising a buffer configured to at least temporarily store the data;
   a receiver configured to receive a message from a server, the message including information about a number of modes for removal of the data from a buffer at the client device; and
   a controller configured to select a mode for removal of the data from the buffer with a maximum required buffer size among the modes indicated by the information about the modes in the received message, and remove the data from the buffer based on the selected mode,
   wherein the modes comprise a mode where the client device removes complete Moving Picture Experts Group (MPEG) media transport (MMT) processing units (MPUs), a mode where the client device removes complete movie fragments, and a mode where the client device removes complete MMT fragmentation units (MFUs).

10. The apparatus of claim 9, wherein the controller is further configured to calculate an initial delay before starting removal of the data from the buffer, and calculate a rate of removing the data from the buffer.

11. The apparatus of claim 9, wherein the message is a hypothetical receiver buffer model (HRBM) removal message.

12. The apparatus of claim 9, wherein the buffer is a Moving Picture Experts Group (MPEG) media transport protocol (MMTP) de-capsulation buffer.

13. The apparatus of claim 9, wherein the controller is further configured to forward the data from the buffer for presentation to a user.

14. An apparatus in a server for indicating data removal management, the apparatus comprising:
   a controller configured to generate a message including information about a number of modes for removal of received data from a buffer at a client device, the information indicating, for each of the modes, a type of mode for removal of the data; and
   a transmitter configured to send the message to the client device,
   wherein the modes comprise a mode where the client device removes complete Moving Picture Experts Group (MPEG) media transport (MMT) processing units (MPUs), a mode where the client device removes complete movie fragments, and a mode where the client device removes complete MMT fragmentation units (MFUs).

15. The apparatus of claim 14, wherein the information in the message further indicates a required maximum size of the buffer.

16. The apparatus of claim 14, wherein the message is a hypothetical receiver buffer model (HRBM) removal message.

* * * * *